United States Patent Office 3,592,816
Patented July 13, 1971

3,592,816
N-SUBSTITUTED PIPERAZIDES OF LYSERGIC ACID
Franz Troxler and Albert Hofmann, Bottmingen, Switzerland, assignors to Sandoz Ltd. (also known as Sandoz A.G.), Basel, Switzerland
No Drawing. Continuation-in-part of application Ser. No. 614,054, Feb. 6, 1967. This application Nov. 1, 1967, Ser. No. 679,646
Claims priority, application Switzerland, Feb. 8, 1966, 1,756/66; Dec. 9, 1966, 17,530/66; July 19, 1967, 10,250/67
Int. Cl. C07d 51/70
U.S. Cl. 260—268                                  14 Claims

ABSTRACT OF THE DISCLOSURE

The present invention relates to compounds of general Formula I,

[Structure I]

in which $R_1$ is hydrogen or methyl, and $R_2$ is aralkyl of 7 to 9 carbon atoms, aryl or aryl substituted by one or more of the following radicals: methyl, alkoxy of 1 to 4 carbon atoms, chlorine or bromine, and $\widetilde{x\ y}$ is $-CH=C\diagup$ or $-CH_2-C\diagup H$ and their acid addition salts. The compounds in which $R_1$ is hydrogen and $\widetilde{x\ y}$ is $-CH=C\diagup$ have antidepressive properties. The remaining compounds have sedative properties. The preparation of the compounds is also described.

---

This is a continuation-in-part of our application Ser. No. 614,054 filed Feb. 6, 1967, now abandoned.

The present invention relates to new heterocyclic compounds and a process for their production.

The present invention provides compounds of general Formula I,

[Structure I]

in which $R_1$ signifies a hydrogen atom or a methyl radical, and
$R_2$ signifies an aralkyl radical having from 7 to 9 carbon atoms or an aryl radical, whereby the aryl radical may be substituted by one or more of the following radicals: methyl, alkoxy, having 1-4 carbon atoms, chlorine or bromine, and $\widetilde{x\ y}$ signifies the radical $-CH=C\diagup$ or $CH_2-C\diagup H$ and their acid addition salts.

The present invention further provides a process for the production of compounds of general Formula I and their acid addition salts, characterized in that a reactive functional acid derivative of an acid of general Formula II,

[Structure II]

in which $R_1$ and $\widetilde{x\ y}$ have the above significance, is reacted in a manner known per se with a compound of general Formula III, $H\diagdown N\diagup N-R_2$     III in which $R_2$ has the above significance, and the resulting compound of general Formula I is then optionally converted into its acid addition salts in a manner known per se.

Suitable reactive functional acid derivatives of an acid general Formula II which may be used for the reaction of the invention are its acid chloride hydrochloride, its acid azide or its mixed anhydride with sulphuric acid.

One preferred method of effecting the process of the invention consists in that the acid chloride hydrochloride of an acid of general Formula II is allowed to react with a compound of general Formula III in an organic solvent which is inert under the reaction conditions and in the presence of an acid binding agent, preferably whilst cooling to $-20°$ to $+10°$ C.

Methylene chloride or chloroform may, for example, be used as organic solvent and an excess of the compound of general Formula III, a tertiary organic base, e.g. pyridine or trimethylamine, or an alkali metal carbonate, e.g. potassium carbonate, as acid binding agent. The reaction is usually completed after 15 minutes to 3 hours, after which the reaction mixture is divided by shaking out between an aqueous alkaline solution and an inert, water-immiscible organic solvent or solvent mixture. An aqueous soda solution may, for example, be used as aqueous alkaline solution and chloroform, methylene chloride, ethyl acetate or a mixture of the same as organic solvent. The organic phase is separated, dried and concentrated by evaporating in a vacuum. The compound of general Formula I is isolated from the resulting residue in manner known per se and purified, e.g. by chromatography and/or crystallization.

Compounds of general Formula I, in which $R_1$ and $R_2$ have the above significance and $\widetilde{x\ y}$ signifies the radical

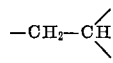

may also be obtained by hydrogenating a compound of general Formula I, in which $R_1$ and $R_2$ have the above significance and

signifies

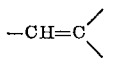

This hydrogenation is preferably effected at room temperature and normal pressure, using a catalyst, e.g. palladium or aluminium oxide or on active charcoal, in an organic solvent which is inert under the reaction conditions, e.g. ethyl acetate, methanol, ethanol or mixtures of methylene chloride and methanol or ethanol. When no more hydrogen is taken up, the catalyst is filtered off, the solvent or solvent mixture is removed and the residue purified in manner known per se, e.g. by crystallization and/or chromatography.

Compounds of general Formula I, in which

and $R_2$ have the above significance and $R_1$ signifies hydrogen, may then optionally be methylated on the indole nitrogen atom in manner known per se, to yield compounds of general Formula I, in which

and $R_2$ have the above significance and $R_1$ signifies methyl.

Methylation may, for example, be effected as follows: 1 mol of a compound of general Formula I, in which $R_1$ signifies hydrogen and $R_2$ and

have the above significance, is added to liquid ammonia containing 1 to 3 mols of an alkali metal amide produced in situ, preferably sodium amide, and 1 to 3 mols of methyl iodide are added. After the reaction has been completed, the ammonia is evaporated, the residue is divided between water or an aqueous sodium carbonate solution and methylene chloride or chloroform and the resulting methylated compound, is isolated and purified as described above.

Compounds of general Formula I are solid compounds which are usually crystalline at room temperature; with suitable organic and inorganic acids they form stable, crystalline and more or less readily water-soluble salts. Examples of acids for acid addition salt formation are: hydrochloric, hydrobromic, sulphuric, phosphoric, fumaric, maleic, malic, acetic and tartaric acid. Compounds I give characteristic colour reactions with Keller's and van Urk's reagents.

The compounds of Formula I are useful because they possess pharmacological activity in animals.

In particular the 1-methyl-lysergic acid derivatives, the 1-methyl-9,10-dihydrolysergic acid derivatives and the 9,10-dihydrolysergic acid derivatives are useful as sedatives as indicated by the Narcosis Potentiation test, the Inhibition of Spontaneous Motor Activity test and the Inhibition of Amphetamine Excitation test, all in the mouse.

For the above mentioned use, the dosage administered will, of course, vary depending on the compound employed, mode of administration and treatment desired. However, in general, satisfactory results are obtained when administered at a daily dosage of from about 5 milligrams to about 200 milligrams per kilogram of animal body weight, preferably given in divided doses 1 to 3 times a day or in sustained release form. For the larger mammals, the total daily dosage is in the range of from about 10 to about 200 milligrams, and dosage forms suitable for oral administration comprise from about 5 milligrams to about 20 milligrams of the compound admixed with a solid or liquid pharmaceutical carrier or diluent.

The lysergic acid piperazides which are unsubstituted on the indole nitrogen atom are useful as antidepressives as indicated by the Antagonism to Tetrabenazine test in the rat, the Reserpine Hypothermia test in the mouse and the Potentiation of DOPA-induced Fighting Behaviour test in the mouse.

For the above mentioned use for the lysergic acid piperazides which are unsubstituted on the indole nitrogen atom, the dosage administered will, of course, vary depending on the compound employed, mode of administration and treatment desired. However, in general, satisfactory results are obtained when administered at a daily dosage of from about 0.01 milligram to about 200 milligrams per kilogram of animal body weight, preferably given in divided doses 1 to 3 times a day or in sustained release form. For the larger mammals, the total daily dosage is in the range of from about 10 to about 200 milligrams, and dosage forms suitable for oral administration comprise from about 5 milligrams to about 20 milligrams of the compound admixed with a solid or liquid pharmaceutical carrier or diluent.

The compounds of the invention may be used as pharmaceuticals on their own or in the form of appropriate medicinal preparations for administration, e.g. enterally or parenterally. In order to produce suitable medicinal preparations the compounds are worked up with organic or inorganic adjuvants which are inert and physiologically acceptable. Examples of such adjuvants are:

for tablets and dragées: lactose, starch, talc and stearic acid;

for syrups: solutions of cane sugar, invert sugar and glucose;

for injectable solutions: water, alcohols, glycerin and vegetable oils;

for suppositories: natural or hardened oils and waxes.

The preparations may furthermore contain suitable preserving, stabilizing and wetting agents, solubilizers, sweetening and colouring substances and flavourings.

The term "in manner known per se" as used herein designates methods in use or described in the literature on the subject.

In the following non-limitative examples all temperatures are indicated in degrees centigrade and are corrected.

EXAMPLE 1 d-lysergic acid N-phenyl-piperazide 10 cc. of N-phenyl-piperazine are added to a suspension cooled to 0° of 5 g. of d-lysergic acid chloride hydrochloride in 200 cc. of methylene chloride, whereby the temperature rises to 10°. The reaction mixture is stirred at room temperature for a further hour and is subsequently shaken out between a soda solution and chloroform. The organic phase is separated, dried over potassium carbonate and evaporated to dryness after filtering off the drying agent. The dry residue is mixed with ether and the ether-insoluble material is chromatographed on 240 g. of silica gel, whereby the compound mentioned in the heading is washed into the filtrate with chloroform containing 1.5–2% of methanol. After removing the solvent, the resulting compound indicated in the heading is converted into its bimaleate by reacting with maleic acid in acetone.

Bimaleate: needles from methanol, melting point 200°, $[\alpha]_D^{20} = -20°$ (c.=0.5 in 50% alcohol). Keller's and van Urk's colour reactions: blue.

EXAMPLE 2

1-methyl-d-lysergic acid N-phenyl-piperazide

The compound mentioned in the heading is obtained in a manner analogous to that described in Example 1, by reacting 5 g. of 1-methyl-d-lysergic acid chloride hydrochloride and 10 cc. of N-phenyl-piperazine. After working up in a manner analogous to that described in Example 1 and recrystallizing from methanol (prisms), 1-methyl-d-lysergic acid N-phenyl-piperazide has a melting point of 221–223°, $[\alpha]_D^{20}=+5°$ (c.=0.5 in pyridine). The bimaleate is produced by reacting 1-methyl-d-lysergic acid N-phenyl-piperazide with maleic acid in acetone.

Bimaleate: Needles from methanol, melting point 220–222°, $[\alpha]_D^{20}=-37°$ (c.=0.5 in 67% methanol). Keller's and van Urk's colour reactions: blue.

EXAMPLE 3

1-methyl-d-lysergic acid N-phenyl-piperazide 1.6 g. of d-lysergic acid N-phenyl-piperazide are added to a solution of 225 mg. of sodium in 250 cc. of liquid ammonia which has been decolourized with a trace of iron-III-nitrate, after stirring for 15 minutes 1.95 g. of methyl iodide are added and after a further 15 minutes the ammonia is evaporated in the absence of moisture. The dry residue is shaken out between water and chloroform, the chloroform solution which has been dried over potassium carbonate is evaporated to dryness and the dry residue is chromatographed on aluminium oxide. The compound mentioned in the heading is washed into the filtrate with chloroform containing 1.5–2% of methanol. After evaporating the solvent, the residue is recrystallized from methanol. The resulting prisms have a melting point of 220–222°, $[\alpha]_D^{20}=+5°$ (c.=0.5 in pyridine). The bimaleate is obtained by reacting the base with maleic acid in acetone. After recrystallization from methanol (needles) the bimaleate has a melting point of 218–219°, $[\alpha]_D^{20}=-37°$ (c.=0.5 in 67% methanol). Keller's and van Urk's colour reactions: blue.

EXAMPLE 4

9,10-dihydro-d-lysergic acid N-phenyl-piperazide 21 g. of 9,10-dihydro-d-lysergic acid chloride hydrochloride are suspended in 150 ml. of absolute methylene chloride, the suspension is cooled to −15° and a solution of 11.7 g. of N-phenyl-piperazine in 10 ml. of absolute methylene chloride is added dropwise whilst stirring. After the addition of 10 ml. of absolute pyridine, the temperature of the reaction mixture is brought to 0° with ice water and stirring is effected for half an hour; the mixture is then allowed to react at room temperature whilst stirring for 2 hours. 200 ml. of 2 N soda solution are added to the reaction mixture, shaking out is effected with a mixture of ethyl acetate and methylene chloride, the organic phase is dried over potassium carbonate, the drying agent is filtered off and the solvent mixture evaporated. The residue is chromatographed with methylene chloride/methanol on 250 g. of aluminium oxide and subsequently crystallized from methylene chloride/ethanol. The resulting 9,10-dihydro-d-lysergic acid N-phenyl-piperazide has a melting point of 261–263° (decomposition), $[\alpha]_D^{20}=-82.5°$ (c.=2 in methylene chloride/methanol 1:1).

Bitartrate: Needles from ethanol/water, melting point 210–211° (decomposition), $[\alpha]_D^{20}=-65°$ (c.=1 in dimethyl sulphoxide).

EXAMPLE 5

1-methyl-9,10-dihydro-d-lysergic acid N-phenyl-piperazide 4.15 g. of metallic sodium are dissolved in 300 ml. of liquid ammonia and conversion into the sodium ethanolate is effected by the dropwise addition of 9.6 g. of absolute ethanol. 15 g. of 9,10-dihydro-d-lysergic acid N-phenyl-piperazide are added to the colourless suspension of the sodium ethanolate, whereby an almost clear solution results. Stirring is effected at −45° for 5 minutes and a solution of 25.6 g. of methyl iodide in 25 ml. of absolute ether is added dropwise during the course of 5 minutes, whereby a thick crystalline mash is rapidly formed, which is stirred for a further 45 minutes in order to complete the reaction. Working up is effected by removing the ammonia in a vacuum, dividing the residue several times between methylene chloride and dilute soda solution, drying the combined organic phases over potassium carbonate filtering off the drying agent and removing the solvent. The remaining almost colourless foam is dissolved in methylene chloride, filtered over 300 g. of aluminium oxide and crystallized from ethanol and yields pure 1-methyl-9,10-dihydro-d-lysergic acid N-phenyl-piperazide in the form of colourless druses having a melting point of 170–171°, $[\alpha]_D^{20}=-91.5°$ (c.=2 in methanol/methylene chloride 1:1).

Bitartrate: Colourless crystals from methylene chloride/ethanol, melting point 214–216° (decomposition), $[\alpha]_D^{20}=-47.5°$ (c.=1.5 in methylene chloride containing 20% of methanol).

EXAMPLE 6

9,10-dihydro-d-lysergic acid N-phenyl-piperazide 36 g. of d-lysergic acid N-phenyl-piperazide are dissolved in 750 ml. of a mixture of ethanol/methylene chloride (1:1) and hydrogenation is effected at room temperature and normal pressure in the presence of 25 g. of a prehydrogenated palladium/aluminium oxide catalyst. After the taking up of hydrogen has been completed (about 2 hours) the catalyst is filtered off and the methylene chloride removed in a vacuum in a rotatory evaporator, whereby crystallization occurs. The resulting, pure 9,10-dihydro-d-lysergic acid N-phenyl-piperazide has a melting point of 261–263° (decomp.), $[\alpha]_D^{20}=-82.5°$ (c.=2 in methylene chloride/methanol 1:1).

EXAMPLE 7 d-lysergic acid N-(m-chlorophenyl)piperazide

A mixture of 10 cc. of absolute pyridine in 10 cc. of absolute dimethyl formamide is carefully added to a suspension cooled to −15° of 3.23 g. (10 millimols) of d-lysergic acid chloride hydrochloride in 15 cc. of absolute methylene chloride. 2.68 g. (10 millimols) of N-(m-chlorophenyl(piperazine dihydrochloride are then immediately added at 0°. The reaction mixture is stirred in the dark at room temperature for 2 hours, is worked up by covering with a layer of 100 cc. of a 2 N soda solution and is shaken thoroughly in a separating funnel. The aqueous phase is again extracted several times with methylene chloride containing 10% of methanol, and the combined organic phases are dried over sodium sulphate. After filtering and distilling off the solvent at reduced pressure at a bath temperature of 60° the crude base is chromatographed on 200 g. of aluminium oxide having a degree of activity II–III. The compound indicated in the heading is eluted with methylene chloride containing 0.2% of methanol. After crystallization from ethanol the compound has a M.P. of 228–232° (decomp.), $[\alpha]_D^{20}=+34.5°$ (c.=1, methanol:methylene chloride=1:1).

Bimaleate: From methylene chloride/ethanol and subsequent concentration in a vacuum. M.P. 149–152° (decomp.), $[\alpha]_D^{20}=-23.2°$ (c.=1, methanol:methylene chloride=1:1).

The d-isolysergic acid N-(m-chlorophenyl)piperazide is eluted with methylene chloride containing 0.4% of methanol. After crystallization from ethanol the compound has a M.P. of 125–130° (decomp.), $[\alpha]_D^{20}=+182.5°$ (c.=1, methanol:methylene chloride=1:1).

EXAMPLE 8 d-lysergic acid N-(p-chlorophenyl)piperazide 3.23 g. (10 millimols) of d-lysergic acid chloride hydrochloride are reacted with 2.68 g. (10 millimols) of N - (p - chlorophenyl)piperazine dihydrochloride in a manner analogous to that described in Example 7.

d - isolysergic acid N-(p-chlorophenyl)piperazide is very difficultly soluble and already crystallizes in sufficiently pure form while the dried organic extracts are being distilled off. M.P. 273–277° (decomp.), $$[\alpha]_D^{20}=+168°$$

(c.=1, dimethyl-sulphoxide).

After distilling off the solvent the filtrate is chromatographed on a 50-fold quantity of aluminium oxide of activity II–III. The compound indicated in the heading is eluted with methylene chloride containing 0.5% of methanol. After crystallization from methanol the compound has a M.P. of 175–177° (decomp.), $[\alpha]_D^{20} = +21.2°$ (c.=1, methylene chloride).

Bimaleate: From methylene chloride/methanol after concentration in a vacuum. M.P. 199–202°, $$[\alpha]_D^{20} = -23.6°$$

(c.=1, methylene chloride:methanol=1:1).

EXAMPLE 9 d-lysergic acid N-(o-chlorophenyl)piperazide 3.23 g. (10 millimols) of d-lysergic acid chloride hydrochloride are reacted with 2.68 g. (10 millimols) of N-(o-chlorophenyl)piperazine dihydrochloride in a manner analogous to that described in Example 7, and the reaction mixture is worked up as indicated in said example.

After crystallizing from ethanol the compound indicated in the heading has a M.P. of 176–178° (decomp.), $[\alpha]_D^{20} = +27.1°$ (c.=1 methylene chloride:methanol=1:1).

Bimaleate: From methylene chloride/methanol after concentration in a vacuum. M.P. 208–210° (decomp.), $[\alpha]_D^{20} = -25.6°$ (c.=1, methylene chloride).

The d-isolysergic acid N-(o-chlorophenyl)piperazide is amorphous. $[\alpha]_D^{20} \geq +140°$ (c.=1, methylene chloride).

EXAMPLE 10 d-lysergic acid N-(o-tolyl)piperazide 3.23 g. (10 millimols) of d-lysergic acid chloride hydrochloride are reacted with 2.48 g. (10 millimols) of N-(tolyl)piperazine dihydrochloride in a manner analogous to that described in Example 7, and the mixture of crude bases is isolated. The mixture of crude bases is chromatographed on a 50-fold quantity of aluminium oxide of activity II–III, whereby methylene chloride containing 0.2% of methanol is used for elution. The compound indicated in the heading is first eluted; after crystallization from methanol the compound has a M.P. of 161–166° (decomp.), $[\alpha]_D^{20} = +33.7°$ (c.=1, methylene chloride:methanol=1:1).

Bimaleate: M.P. 155–157° (decomp., from methanol/methylene chloride), $[\alpha]_D^{20} = -24.9°$ (c.=1, methylene chloride:methanol=1:1.

The further fractions contain d-isolysergic acid N-(o-tolyl)piperazide, which after crystallization from ethanol has a M.P. of 219–221° (decomp.), $[\alpha]_D^{20} = +186°$ (c.=1, methyene chloride:methanol=1:1).

EXAMPLE 11 d-lysergic acid N-(o-methoxyphenyl)piperazide 3.23 g. (10 millimols) of d-lysergic acid chloride hydrochloride are reacted with 2.64 g. (10 millimols) of N-(o-methoxyphenyl)piperazine dihydrochloride in a manner analogous to that described in Example 7, and the mixture of crude bases is isolated.

The mixture of crude bases is chromatographed on a 50-fold quantity of aluminium oxide of activity II–III, whereby the compound indicated in the heading is eluted with methylene chloride containing 0.4% of methanol. The compound has a M.P. of 138–143° (decomp., from ethanol), $[\alpha]_D^{20} = +28.8°$ (c.=1, methylene chloride:methanol=1:1).

Bimaleate: From ethanol/methylene chloride after concentrating the solution in a vacuum. M.P. 199–202° (decomp.), $[\alpha]_D^{20} = -24.9°$ (c.=1, methylene chloride:methanol=1:1).

The d-isolysergic acid N-(o-methoxyphenyl)piperazide is washed from the column with methylene chloride containing 0.6% of methanol and precipitates in the form of a yellowish resin. $[\alpha]_D^{20} = +220°$ (c.=1, methylene chloride).

EXAMPLE 12 d-lysergic acid N-(p-methoxyphenyl)piperazide 3.23 g. (10 millimols) of d-lysergic acid chloride hydrochloride are reacted with 2.64 g. (10 millimols) of N-(p-methoxyphenyl)piperazine dihydrochloride in a manner analogous to that indicated in Example 7, and the mixture of crude bases is isolated. The mixture of crude bases is chromatographed on a 50-fold quantity of aluminium oxide, whereby the compound indicated in the heading is eluted in the form of a resin with methylene chloride containing 0.6% of methanol.

Bimaleate: M.P. 155–157° (decomp., from methanol), $[\alpha]_D^{20} = -22.8°$ (c.=1, methylene chloride:methanol=1:1).

The d-isolysergic acid N-(p-methoxyphenyl)piperazide is eluted with methylene chloride containing 0.8% of methanol and after crystallization from methanol has a M.P. of 224–226° (decomp.). $[\alpha]_D^{20} = +190°$ (c.=1, methyene chloride:methanol=1:1).

EXAMPLE 13 d-lysergic acid N-(2,5-dimethoxyphenyl)piperazide 3.23 g. (10 millimols) of d-lysergic acid chloride hydrochloride are reacted with 2.94 g. (10 millimols) of N-(2,5-dimethoxyphenyl)piperazine dihydrochloride in a manner analogous to that indicated in Example 7, and the mixture of crude bases is isolated.

The mixture of crude bases is chromatographed on a 60-fold quantity of aluminium oxide of activity II–III, whereby the compound indicated in the heading is eluted with methylene chloride containing 0.1% of methanol, in the form of a resin which does not crystallize. After crystallization from methanol/ether the bitartrate has a M.P. of 159–163° (decomp.), $[\alpha]_D^{20} = +1°$ (c.=1, methylene chloride: methanol=1:1).

The d-isolysergic acid N-(2,5-dimethoxyphenyl)piperazide which also results in resin-like form is eluted with methylene chloride containing 0.3% of methanol. $[\alpha]_D^{20}$ of the approximately 96% crude product=$+156°$ (c.=1, methylene chloride: methanol=1:1).

EXAMPLE 14 d-lysergic acid N-(benzyl)piperazide

A solution of 1.76 g. of N-benzyl-piperazine in 5 cc. of absolute pyridine is slowly added dropwise to a suspension cooled to $-15°$ of 3.23 g. (10 millimols) of d-lysergic acid chloride hydrochloride in 25 cc. of absolute methylene chloride while stirring. The reaction mixture is subsequently stirred at 0° for 30 minutes and finally at room temperature for 2 hours, is worked up by adding 100 cc. of a 2 N soda solution and is thoroughly shaken in a separating funnel. The aqueous phase is again extracted several times with methylene chloride and the combined organic phases are dried over sodium sulphate. After filtering and distilling off the solvent at reduced pressure at a bath temperature of 60°, the crude base which is obtained in the form of a brown foam is chromatographed on 200 g. of aluminium oxide of activity II–III. The compound indicated in the heading is eluted with methylene chloride containing 0.3% of methanol in the form of a foam which does not crystallize; the bimaleate has a M.P. of 165–168° (decomp.), $[\alpha]_D^{20} = +28.4°$ (c.=1, pyridine).

The d-isolysergic acid N-(benzyl)piperazide which also does not crystallize, is obtained with methylene chloride containing 0.5% of methanol. $[\alpha]_D^{20} = +162°$ (c.=1, methylene chloride:methanol=1:1).

What is claimed is:

1. A compound selected from the group consisting of a compound of the formula

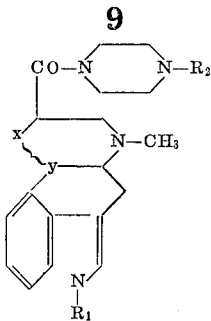

in which $R_1$ is hydrogen or methyl, $R_2$ is phenyl, benzyl, tolyl, chlorophenyl, bromophenyl, alkoxyphenyl having 1 to 4 carbon atoms in the alkoxy moiety and dialkoxyphenyl having 1 to 4 carbon atoms in each of the alkoxy moieties, and

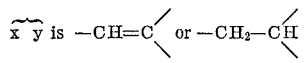

and the pharmaceutically acceptable acid addition salts thereof.

2. A compound according to claim 1, in which the compound is 1-methyl-d-lysergic acid N-phenyl-piperazide.

3. A compound according to claim 1, in which the compound is 9,10-dihydro-d-lysergic acid N-phenyl-piperazide.

4. A compound according to claim 1, in which the compound is 1-methyl-9,10-dihydro-d-lysergic acid N-phenyl-piperazide.

5. A compound of claim 1 in which $R_1$ is hydrogen, $R_2$ is as defined and

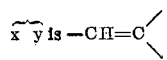

6. A compound according to claim 5, in which the compound is d-lysergic acid N-phenyl-piperazide.

7. A compound according to claim 5, in which the compound is d-lysergic acid N-(m-chlorophenyl)piperazide.

8. A compound according to claim 5, in which the compound is d-lysergic acid N-(p-chlorophenyl)piperazide.

9. A compound according to claim 5, in which the compound is d-lysergic acid N-(o-chlorophenyl)piperazide.

10. A compound according to claim 5, in which the compound is d-lysergic acid N-(o-tolyl)piperazide.

11. A compound according to claim 5, in which the compound is d-lysergic acid N-(o-methoxyphenyl)piperazide.

12. A compound according to claim 5, in which the compound is d-lysergic acid N-(p-methoxyphenyl)piperazide.

13. A compound according to claim 5, in which the compound is d-lysergic acid N-(2,5-dimethoxyphenyl) piperazide.

14. A compound according to claim 5, in which the compound is d-lysergic acid N-(benzyl) piperazide.

References Cited

UNITED STATES PATENTS

| | | | |
|---|---|---|---|
| 2,997,470 | 8/1961 | Pioch | 260—268X |
| 3,188,313 | 6/1965 | Archer | 260—268 |

DONALD G. DAUS, Primary Examiner

U.S. Cl. X.R.

260—285.5; 424—261